Patented Aug. 4, 1942

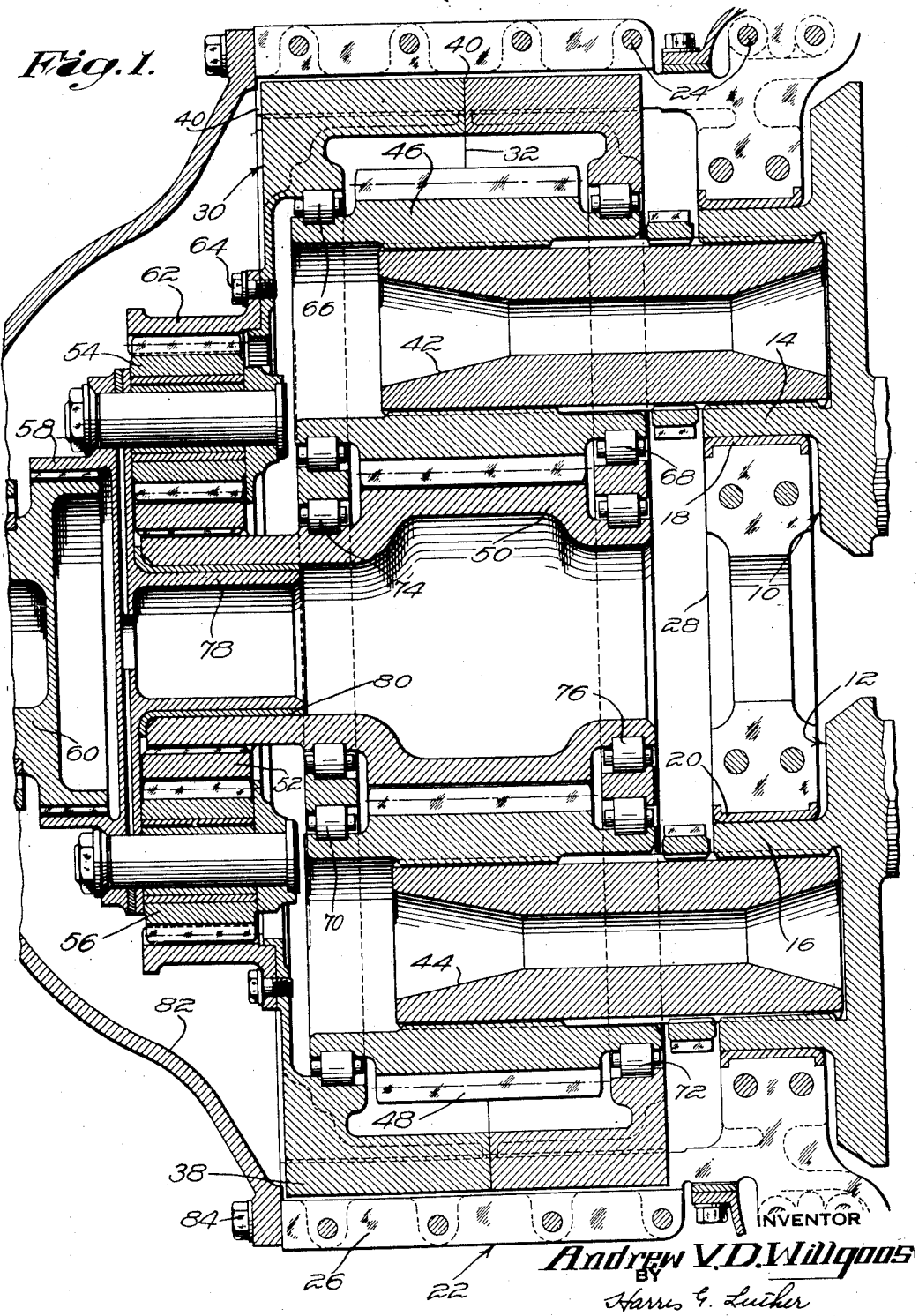

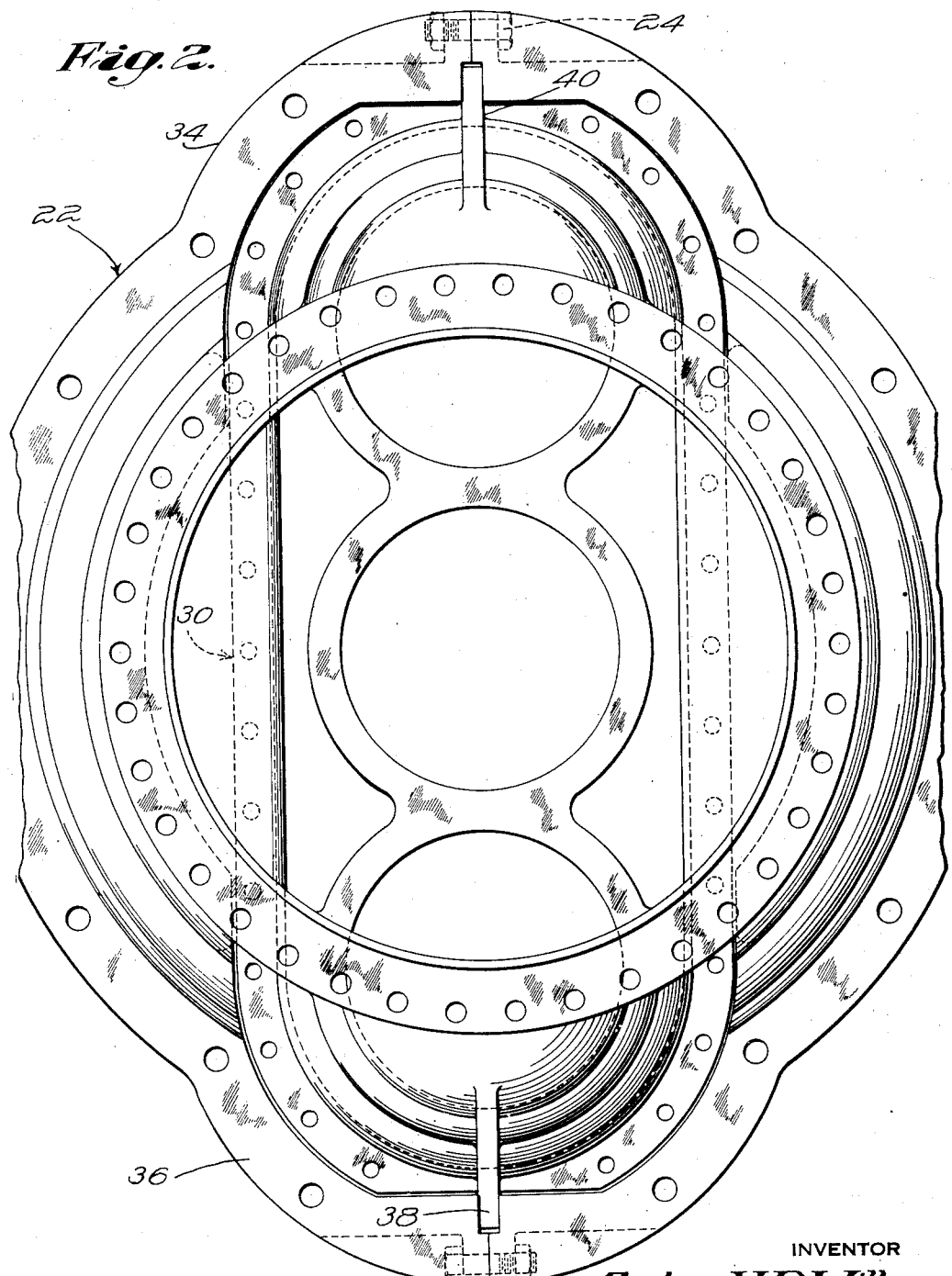

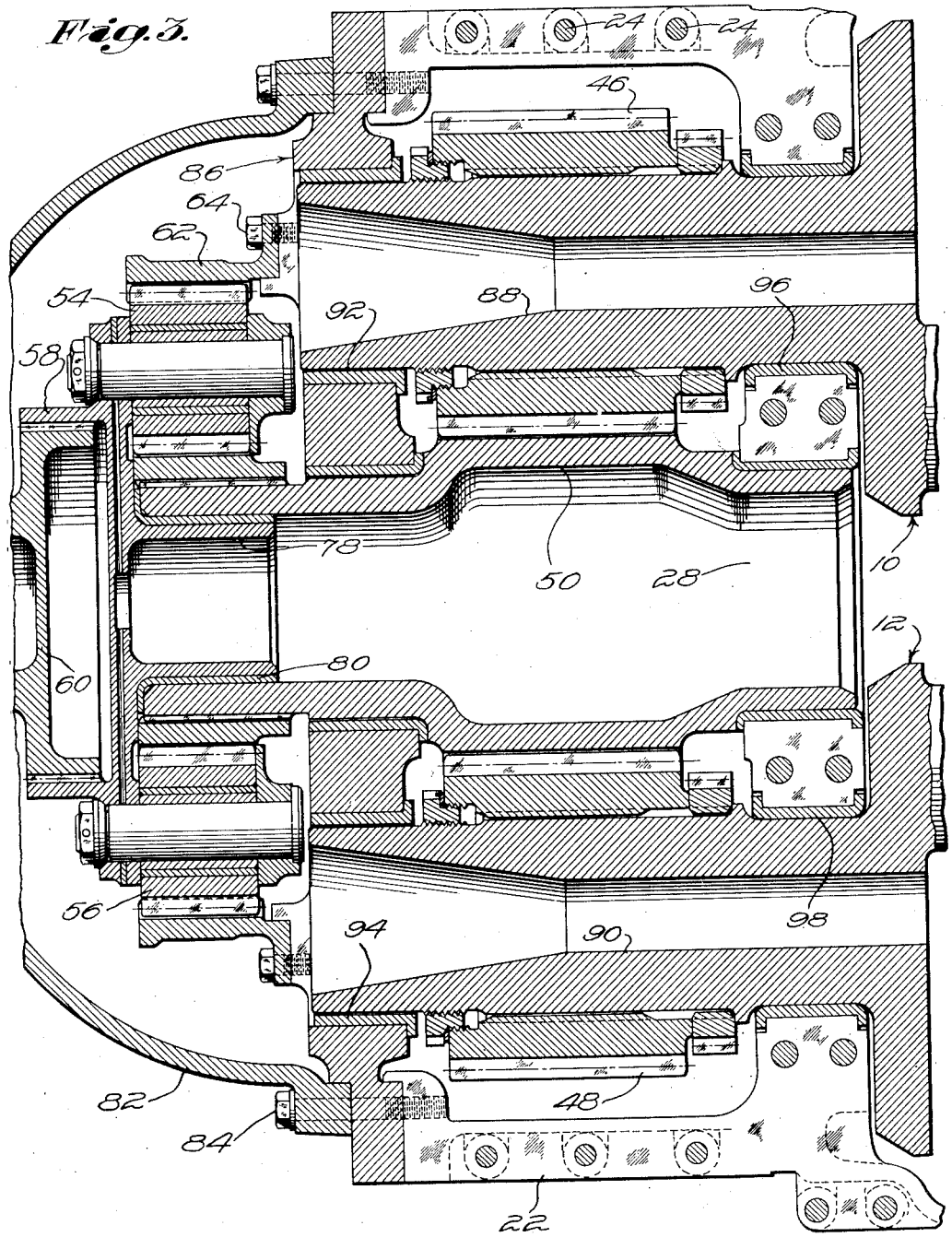

2,292,186

UNITED STATES PATENT OFFICE 2,292,186

GEAR TRANSMISSION

Andrew V. D. Willgoos, West Hartford, Conn., assignor to United Aircraft Corporation, East Hartford, Conn., a corporation of Delaware Application July 11, 1940, Serial No. 344,934

10 Claims. (Cl. 74—389)

This invention relates to improvements in gear transmissions and has particular reference to an improved gear mechanism for transmitting power from an engine to an engine driven shaft with a change in speed between the engine and the shaft.

An object of the invention resides in the provision of an improved gear mechanism having a housing of a light weight metal and a bearing support of strong metal for resisting the reaction to the loads transmitted between the gears.

A further object resides in the provision of an improved gear mechanism for transmitting torque from a pair of drive shafts to a single driven shaft and for simultaneously maintaining the drive shafts in phase relation with each other without imposing highly localized stresses on the gear elements or shafts.

A still further object resides in the provision of a power transmitting gear mechanism for an engine in which the gear train is an integral unit having a limited degree of freedom relative to the engine and has only a torque transmitting connection with the engine crankshaft or crankshafts.

Other objects and advantages will be more particularly pointed out hereinafter or will become apparent as the description proceeds.

In the accompanying drawings, in which like reference numerals are used to designate similar parts throughout, there is illustrated, in two slightly modified forms, a suitable mechanical embodiment for the purpose of disclosing the invention. The drawings, however, are for the purpose of illustration only and are not to be taken as limiting the invention since it will be apparent to those skilled in the art that various changes in the illustrated constructions may be resorted to without in any way exceeding the scope of the invention.

In the drawings,

Fig. 1 is a transverse sectional view through a reduction gear unit constructed according to the invention.

Fig. 2 is a front elevational view of the gear case with the front cover removed, and Fig. 3 is a transverse sectional view through a somewhat modified gear unit.

Referring to the drawings in detail and particularly to Figs. 1 and 2, the numerals 10 and 12 generally indicate respectively the two parallel crankshafts of a two crankshaft engine such as an H type engine. At their forward ends these shafts are provided with hollow internally splined bosses, as indicated at 14 and 16, which bosses are supported in respective bearings 18 and 20 mounted in an outer gear case or housing, generally indicated at 22.

This housing is made up of two substantially semi-cylindrical portions, secured together by suitable means such as the bolts 24, and when the two parts are assembled together the housing presents a hollow somewhat conical structure having a generally cylindrical portion 26 at one end of which there is an apertured transverse partition 28. This outer housing is preferably made of some relatively light metal or alloy, such as an aluminum alloy, in order to maintain the weight of the gear unit at the minimum.

Within the cylindrical portion 26 of the outer casing 22 there is disposed a gear cage, generally indicated at 30, preferably formed of some strong durable metal or alloy such as steel. This cage, as particularly shown in Fig. 2, is an oblong hollow body having straight side walls and generally semi-circular end portions and is provided with transverse walls apertured to receive the bearings for the shafts presently to be described. For convenience in assembly this cage member is preferably made in two portions separable along a transverse plane, indicated by the line 32 in Fig. 1. In the construction illustrated the cage is somewhat longer than the diameter of the outer casing 22 at the location of the cage and the outer casing is provided with diametrically opposite protrusions 34 and 36 to receive the end portions of the cage. At each end the cage is provided with an integral rib or fin, as indicated at 38 and 40, which fins extend into grooves provided in the outer casing by machining depressions in the abutting surfaces of the separable portions of the outer casing. This construction firmly supports the cage in the outer casing against the torsional forces exerted by the casing supported gears while permitting a limited freedom of relative movement between the cage and the outer casing to accommodate slight errors in alignment of the outer casing with the shaft of the gear unit and permit slight relative movements between the casing and cage under vibration imposed stresses.

Each of the bosses 14 and 16 on the ends of the engine crankshafts receives a respective stub shaft, as indicated at 42 and 44 respectively, and these shafts extend into respective spur gears, as indicated at 46 and 48 mounted in the cage 30, spline connections being provided between the stub shaft and the bosses and the stub shafts and the gears so that these spur gears will rotate with the engine crankshafts. A center gear element 50 is disposed within the cage between and meshing with the spur gears 46 and 48 and projects at one end out of the cage 30 where it has a splined connection with a drive gear 52 which meshes with a plurality of pinion gears, two of which are indicated at 54 and 56. These pinion gears are carried by a cage member 58 which has an internal spline connection with a propeller shaft 60, and mesh with a fixed outer ring gear 62 which is rigidly secured to the cage 30 by suitable means, such as the bolts 64. Each of the gear elements 46 and 48 is mounted in a pair of end bearings mounted in the end apertures in the transverse walls of the cage member 30, the bearings for the gear 46 being indicated at 66 and 68 and the bearings for the gear 48 being indicated at 70 and 72. The center gear 50 is similarly supported by bearings mounted in the center apertures of the transverse walls of the cage, as indicated at 74 and 76. These bearings 66, 68, 70, 72, 74 and 76 are shown as anti-friction bearings in each of which the associated gear elements constitute the inner race and the cage wall constitutes the outer race, the anti-friction elements in each case being disposed btween the adjacent portion of the associated gear element and the wall of the gear aperture in the cage. As the cage and the gear elements are preferably formed of some material which can be given a hard and accurate surface, this construction simplifies the gear unit design and also reduces the weight of the unit by omitting separate races for these bearings.

The cage member 58 is preferably provided with an axial extension 78 which projects into the adjacent end of the center gear 50 and is provided with a plain bearing 80 fitting the inner surface of the center gear to assist in supporting the propeller shaft in the gear unit.

A nose piece 82 is secured to the propeller end of the housing 22 by suitable means, such as the bolts 84, and may carry an outboard bearing, not illustrated, for supporting the propeller shaft at the location at which it projects from the engine in the conventional manner, to transmit both the lateral and thrust loads of the shaft back to the engine through the gear housing 22. The propeller shaft is supported entirely by the outer casing and has only a torsional connection with the gear unit so that deflections of the propeller shaft will not be transmitted to any of the gears.

In this arrangement the torsional and thrust loads are supported by the outer housing 22, a housing of some relatively light material, such as an aluminum or magnesium alloy, having been found to be adequate for supporting these loads. The relatively high tooth load forces tending to separate the gears 46 and 48 from the center gear 50, however, are resisted by the steel cage 30 so that the outer housing is relieved of these relatively high distorting forces.

In this arrangement the gear unit, including the cage 30, is a complete unit in itself that may be separately assembled before installation in the engine and may be quickly and easily replaced as a unit if necessary. The gears may be mounted in the cage and accurately adjusted during the assembly of the gear unit before installation in the engine. The gears themselves, including the fixed ring gear 62 and drive gear 52 as well as the connecting gears 46, 48 and 50, are all held in exact operative relationship with respect to each other but the entire gear unit may move in the casing 22 to relieve any stresses that might be set up in the gearing by distortion or eccentric rotation of the engine crankshafts or the propeller shaft. This arrangement thus provides a composite structure in which the crankshaft ends and the propeller shaft are supported in the outer casing and all of the gears are supported in the cage which is supported by the casing but not rigidly connected therewith, and the connections between the shafts and the gears are purely torsional.

The arrangement shown in Fig. 3 is similar to that shown in Figs. 1 and 2 and described above except that the steel cage 30 is omitted and an anchor plate, generally indicated at 86, is substituted therefor. Also, if desired, the stub shafts 42 and 44 may be made integral with the respective crankshafts 10 and 12, these crankshaft extensions being indicated at 88 and 90 in Fig. 3. In this case the gear elements 46 and 48 are carried on the respective crankshaft portions 88 and 90 and these portions have respective end bearings 92 and 94 in the anchor plate 86 and intermediate bearings 96 and 98 in the housing partition 28.

The peripheral portion of the anchor plate may be disposed between the nosepiece 82 and the adjacent end of the outer housing 22 and held in position by the bolts 84 which secure the nosepiece to the main housing. This anchor plate may be formed of steel or of a lighter substance such as an aluminum alloy provided it is made sufficiently rugged to withstand the separating forces exerted by the teeth of the gears 46, 48 and 50, since, in this construction, the anchor plate and the partition 28 function to support the gear shaft and withstand the tooth pressure loads.

While two slightly different mechanical embodiments have been hereinabove described and illustrated in the accompanying drawings as suitable examples for the purpose of disclosing the invention, it is to be understood that the invention is not limited to the particular constructions so illustrated and described, but that such changes in the size, shape and arrangement of the various parts may be resorted to as come within the scope of the sub-joined claims.

Having now described the invention so that others skilled in the art may clearly understand the same, what it is desired to secure by Letters Patent is as follows:

1. In a gear transmission disposed between an engine and a driven shaft, a pair of engine driven gears, a center gear meshing with said engine driven gears, a driven shaft, a reduction gear mechanism between said center gear and said driven shaft, a casing enclosing said gears, and a cage supported in said casing against relative rotation also surrounding said gears and providing end bearings therefor, said cage having a loose supporting connection with said casing to provide a limited freedom of movement of the cage relative to the casing, whereby said cage and said gears may move relative to said casing.

2. In a gear transmission disposed between an engine and a driven shaft, a pair of engine driven gears, a center gear between and meshing with said engine driven gears, a driven shaft, a reduction gear mechanism between said center gear and said driven shaft, a casing enclosing said gears, end bearings for said engine driven gears and said center gear, and gear supporting means carried by said casing and held against rotation relative to said casing and carrying said end bearings and said reduction gear mechanism and resisting the torque induced gear separating forces on said gear bearings so that none of said forces are transmitted to said casing.

3. In a gear transmission disposed between an engine and a driven shaft, a pair of engine driven gears, a center gear between and meshing with said engine driven gears, a driven shaft, a reduction gear mechanism between said center gear and said driven shaft, a casing enclosing said gears, end bearings for said engine driven gears and said center gear, and a steel cage supported within said casing against rotational movements surrounding said gears and providing a support for said end bearings and said reduction gear mechanism, and a loose connection between said cage and said casing.

4. In a gear transmission disposed between an engine and a driven shaft, a pair of engine driven gears, a center gear meshing with said engine driven gears, a driven shaft, a reduction gear mechanism between said center gear and said driven shaft, a casing enclosing said gears, end bearings for said engine driven gears and said center gear, a transverse partition in said casing supporting the bearings at one end of said gears and a transverse anchor plate carried by said casing supporting the bearings at the opposite end of said gears and said reduction gear mechanism.

5. In a gear transmission disposed between an engine drive shaft and a driven shaft, a pair of engine driven gears, a center gear meshing with said engine driven gears, a driven shaft, a reduction gear mechanism between said center gear and said driven shaft, a casing enclosing said gears, end bearings for said engine driven gears and said center gear, a gear cage comprising a steel member effective to resist the torque induced gear separating forces carried by said casing against rotational movements for supporting said end bearings and said reduction gear mechanism, a loose connection between said cage and said casing restraining said cage against rotation relative to said casing but permitting a limited freedom of movement between said cage and said casing to accommodate defects in alignment between said drive shaft and said driven shaft, and axially free spline connections between said engine drive shaft and said engine driven gears and between said reduction gear mechanism and said driven shaft.

6. A transmission gear for an engine having a pair of parallel crankshafts and a single power shaft comprising, a spur gear connected with each crankshaft, a center gear meshing with said spur gears, a gear case carried by said engine, a steel cage carried by said gear case and containing end bearings supporting said gears in operative position, a connection having a limited freedom of axial movement between said cage and said gear case restraining said cage against rotational movements, means including a reduction gear carried by said cage operatively connecting said center gear with said power shaft, and an axially free connection between each crankshaft and the respective spur gear and between said cage and said gear case.

7. A transmission gear for an engine having a pair of parallel crankshafts and a single power shaft comprising, a spur gear connected with each crankshaft, a center gear meshing with said spur gears, a gear case carried by said engine, a steel cage carried by said gear case and held against rotational movements and containing end bearings supporting said gears in operative position, a loose connection between said cage and said gear case, means connecting said center gear with said power shaft, and an axially free connection between each crankshaft and the respective spur gear comprising, an internally splined boss on the end of each crankshaft, internal splines in each spur gear, and an externally splined stub shaft in each respective gear and boss.

8. A transmission gear for an engine having a pair of parallel crankshafts and a single power shaft comprising, a spur gear connected with each crankshaft, a center gear meshing with said spur gears, a gear case carried by said engine, means carried by said gear case and held against rotational movements supporting said gears in operative position, means including a reduction gear carried by said gear supporting means connecting said center gear with said power shaft, and an axially free connection between each crankshaft and the respective spur gear comprising, internal splines in each spur gear, and an externally splined extension on each crankshaft extending into the respective spur gear.

9. The arrangement as set forth in claim 8 including a cage supporting said gears, and a spline connection between said cage and said gear case having a limited freedom of movement relative to said gear case.

10. In combination with an engine having a pair of crankshafts, a single propeller shaft, a housing for supporting one end of each of said crankshafts and for supporting said propeller shaft, a gear unit assembly located between said crankshafts and said propeller shaft, said assembly having a cage for supporting said gears loosely supported in and axially slidable as a unit into and out of said housing, means for preventing rotation of said cage in said housing, and slidable spline connections between said crankshafts and said gear assembly and between said propeller shaft and said gear assembly.

ANDREW V. D. WILLGOOS.